Sept. 8, 1970  J. VOEVODSKY  3,528,056
INTERVEHICULAR COMMUNICATIONS SYSTEM INCLUDING
DECELERATION WARNING SYSTEM
Filed June 10, 1966  3 Sheets-Sheet 1
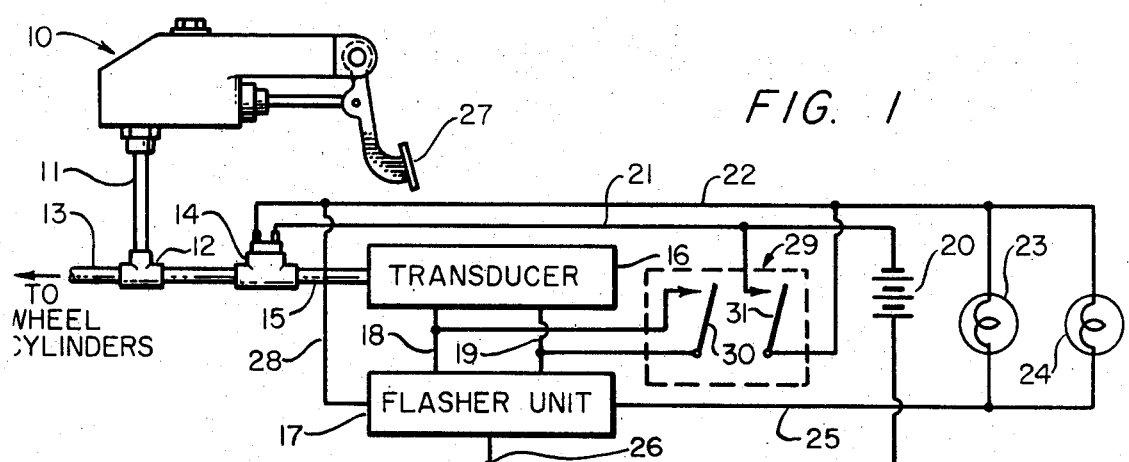
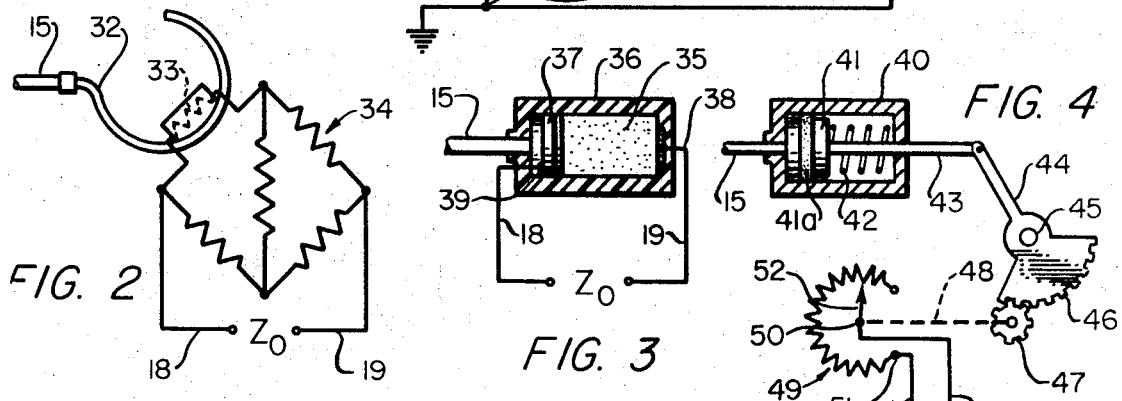
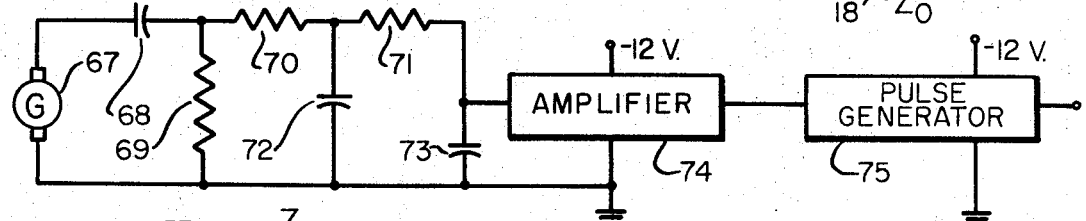
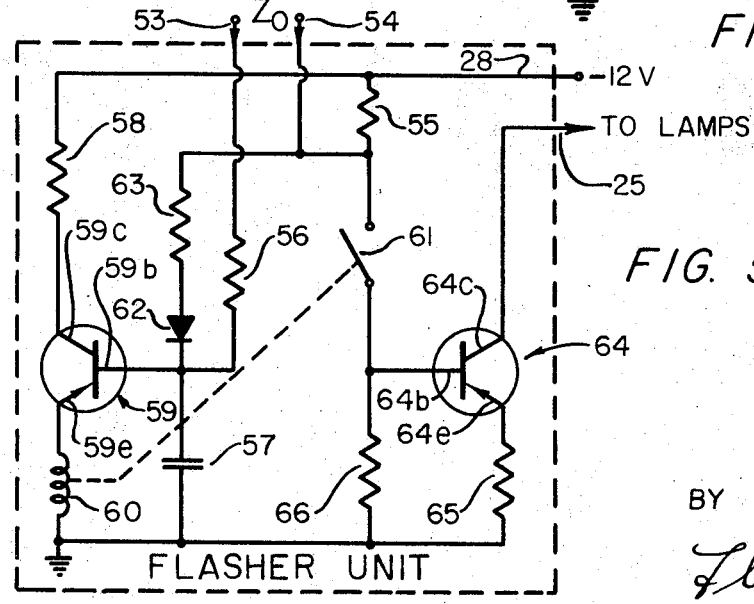
INVENTOR
JOHN VOEVODSKY
BY
ATTORNEYS

INVENTOR.
JOHN VOEVODSKY

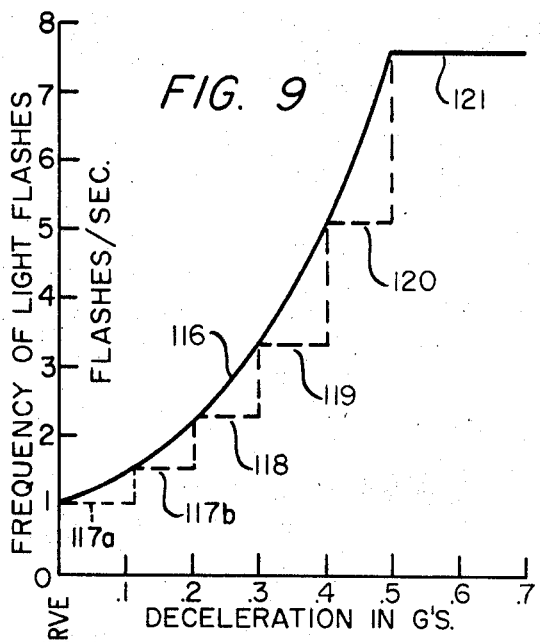
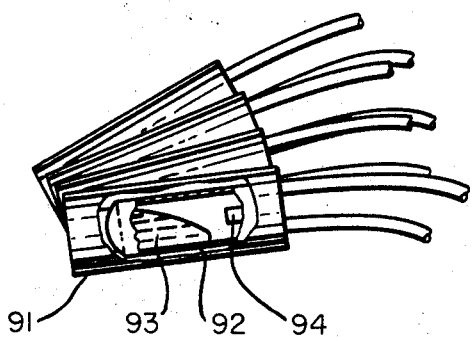
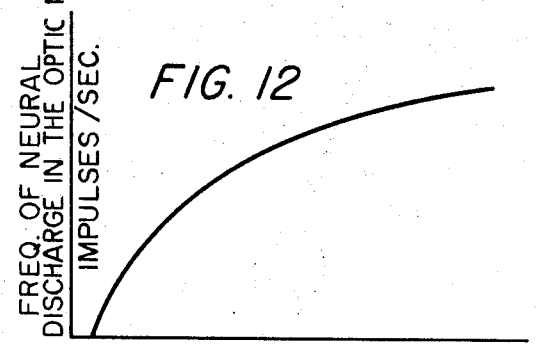
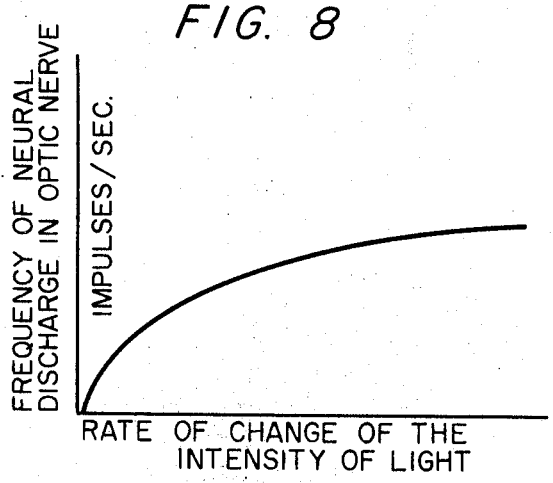
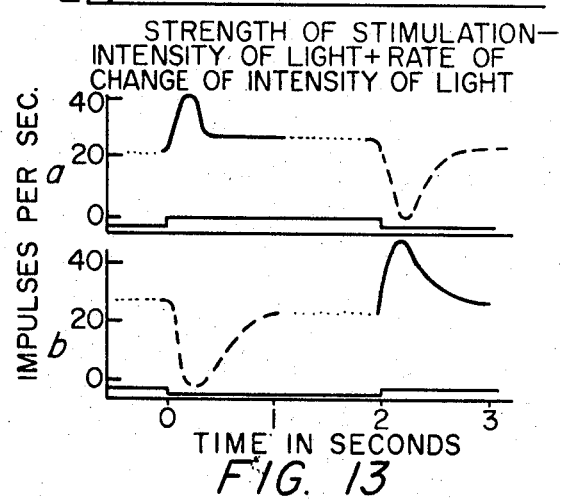
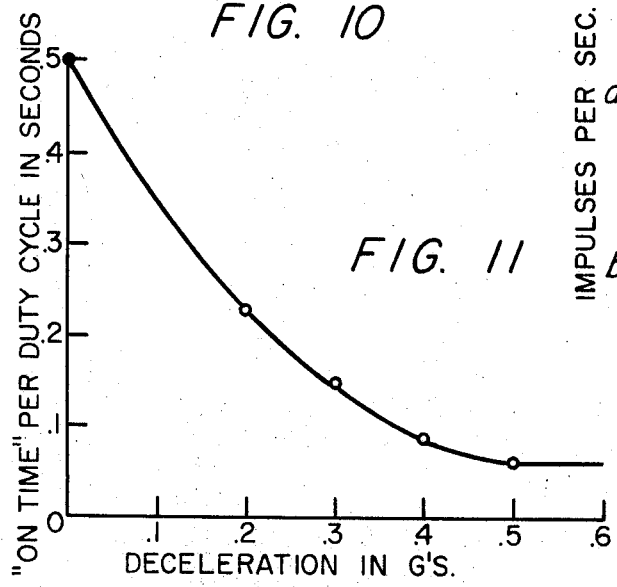

United States Patent Office 3,528,056
Patented Sept. 8, 1970

3,528,056
INTERVEHICULAR COMMUNICATIONS SYSTEM INCLUDING DECELERATION WARNING SYSTEM
John Voevodsky, Palo Alto, Calif.
(P.O. Box 5769, Stanford, Calif. 94305)
Continuation-in-part of application Ser. No. 464,699, June 17, 1965. This application June 10, 1966, Ser. No. 556,770
Int. Cl. B60q 1/26
U.S. Cl. 340—72
22 Claims

ABSTRACT OF THE DISCLOSURE

An intervehicular deceleration warning communications system in which a warning light is mounted on a leading vehicle to communicate a component of deceleration initiated by the driver of the leading vehicle to the driver of a following vehicle. A device for measuring the deceleration of the leading vehicle is rigidly attached to this vehicle and in one form may use an accelerometer formed by mercury switches tilted at different angles with respect to a horizontal. They are progressively closed as the deceleration increases. In another form, deceleration is measured by brake pressure and in still another form a tachometer device is coupled to a rotating part of the automobile. The warning light, mounted on the leading car, is flashed at a rate which varies exponentially with a component of deceleration. With the mercury switch type accelerometer this component of acceleration will take into account the intensity of brake action, the deceleration caused by all other frictional forces including aerodynamic, which vary from vehicle to vehicle, and lastly the deceleration caused by the component of gravitational forces parallel to the slope of the road. The exponential variation compensates for the neural response of the following driver to the flashing light. The "on" time per cycle of the flash is also shortened with an increasing flash rate to provide a redundant warning. The non-linearity between deceleration and the flash rate is produced by a non-linear impedance element in an oscillation circuit or with proper circuit connections of the mercury switches which form an accelerometer. In practice, a flashing rate of from 1 flash per second for zero deceleration becoming 1.5 flashes per second at 0.1 $g$ deceleration and continuing in a like manner to 7.65 flashes per second at 0.5 $g$ is a preferred exponential function.

This application is a continuation-in-part of copending application Ser. No. 464,699, filed June 17, 1965, entitled "Brake Light Warning System" now abandoned in favor of the present application.

The present invention relates generally to a deceleration warning system and more specifically to a deceleration warning system to be used on motor vehicles to alert the motorists in the rear that the lead vehicle is decelerating and the instantaneous degree of deceleration.

The system presently in widespread use on motor vehicles is a two-phase system wherein, in addition to the regular tail lights which burn continuously when in use, one or more braking lights are employed which are illuminated only when the brake pedal is depressed. In this system, when the brakes are applied, the motorist in the following vehicle will see a step increase in the light intensity and possibly an increase in the geometric size of the tail light due to placement of the lamps themselves, providing that he is sufficiently close for visual resolution of the geometry. This is often misleading. For example, the leading vehicle may merely have turned its headlights on, but the following motorist cannot detect the difference between the brake light being illuminated and the tail light when it is first turned on. Additionally, the illumination of the brake light conveys no information as to the rate at which the leading vehicle might come to a stop. Indeed, the motorist in the leading vehicle may be "riding" the brake and is not slowing the vehicle at all. On the other hand, he may be applying considerable braking pressure as opposed to just "riding" the brake but the system provides no differentiable indication of this difference to the following motorist, and hence no warning. A still further shortcoming in the system exists in the frequent instance where the following motorist is not observing the lead vehicle at the time the brake lights go on but does observe the vehicle immediately thereafter. In this case, if the regular tail lights were originally illuminated, he will not be aware of or perceive any increase in intensity because he has no standard of comparison between the two intensities, since, first, there exists a large variation in maximum and minimum intensities of lights displayed on various models and years of vehicles; second, the condition of the lens, i.e., whether or not the lens is clear and clean; third, haze conditions between the lead vehicle and the following vehicle; fourth, the reflection of the sun on the rear bright work of the lead car; and fifth, the basic rule of physics which states that the intensity of the light striking the observer's eye decreases with at least the square of the distance of the observer from the source. Therefore, when the intensity increases due to brake pressure, the observer may perceive that he is closer to the lead car.

The distance between two cars is not often considered dangerous, since on high speed freeways, vehicles often are less than three or four car lengths apart. Furthermore, this difficulty becomes acute on crowded streets and freeways where there are a great number of red tail lights observed by the following motorist and his eye readily becomes confused and relative distances between vehicles are quickly forgotten even if the distances have been noted by the driver.

Several proposals have been made to overcome some of the above-noted defects by providing a brake warning light which will indicate the rate at which the lead vehicle is stopping. Such proposals have included a means for increasing the intensity of the light proportionate to the pedal pressure applied. There are several difficulties with such a system. First, the following motorist has no real standard of comparison as previously noted. This is aggravated by the fact that light intensity falls off as a function of the square of the distance between the light and the point of observation with the result that both the distance and any change in the distance between the vehicles will directly affect the information received by the following motorist. Furthermore, drivers are not overly concerned with the distance between vehicles. Hence, just because the lead vehicle appears closer does not cause alarm in the following driver. It is the rate of change of closing velocity which causes alarm in the following driver. Next, slight or gradual changes in intensity are not readily perceptible to the human eye. Therefore, the observer must interpret the change in intensity in terms of the degree of deceleration which he may expect the lead vehicle to undergo and this interpretation of incoming information often requires more time than is available. It is the time necessary for the eye to note a change of intensity of light or a change in the size of the vehicle and to determine how rapid the change occurs which is critical. Thus, for a crash stop, no more information is available to the following driver than the present system already in use transmits.

Another proposal has been to employ flashing brake lights which flash in proportion to the speed of the vehicle. Thus, the following vehicle will observe a flashing light when the lead vehicle's brakes are applied proportionate to the speed of the vehicle at that time. He will then observe a decrease in the flashing rate as the vehicle slows. This system is not satisfactory in that the flashing rate is determined by the vehicle speed rather than the braking effort applied. The following motorist will be unable to mentally differentiate the rate of decrease in the flashing rate with sufficient speed and accuracy to determine the rate at which the lead vehicle is decelerating. Furthermore, a crash stop from 30 m.p.h. is often as dangerous and injurious to the following driver as a crash stop from 60 m.p.h. The information transmitted to the following driver, however, will be quite different in each case. Thus, the warning again will be inadequate and time consuming.

Another proposal is a system in which the brake lights flash at a rate which is dependent upon the pressure of the hydraulic brake fluid. The mechanism for flashing the lights comprises a thermal element in which the spacing of the contacts is varied in response to the fluid pressure. In mass production, such devices would show variations such that the flashing rates might vary considerably from device to device for the same fluid pressure. Such a device is also highly temperature sensitive and the rates and duty cycle would vary with environmental conditions. Furthermore, such a device cannot be installed on vehicles which use other than hydraulic brake systems, for example, motorcycles which use mechanical systems or trucks which use air brakes. Finally the reliability of a warning system must be such that the reflexive type responses of the following driver are always reinforced. In other words, there is no time to contemplate whether the system being observed is performing correctly.

Another system which has been proposed is to employ different colored lights in conjunction with an accelerometer system to provide different color indication for different decelerations. Such a system is not practical because of the high percent of color-blind drivers (9% of the male population). Further, the problems described above with respect to distance, etc. would also be encountered. Also, this system would require all the drivers to re-adapt to the meaning of a red brake light. In this system, a red light means a crash stop, whereas at present the red brake light has every other meaning including that one.

It is an object of the present invention to provide an improved intervehicular deceleration warning communications system. More specifically, it is an object of this invention to provide a flashing warning light which positively indicates not only that there is deceleration, but also the degree of deceleration regardless of the speed and to cause an involuntary rapid reflexive type response of the following driver.

It is a specific object of this invention to provide a brake warning light system wherein the brake lights are flashed all during the application of the brakes and wherein the rate of flash and/or duty cycle is caused to vary according to the degree at any instant by which the brakes are applied and independent of the speed of application of the brakes.

It is a further specific object of this invention to provide a deceleration warning light system in which the rate of flash is a function of the deceleration experienced.

It is another specific object of this invention to provide a brake warning light wherein the brake lights are caused to flash in accordance with the operator's effect on his vehicle thereby transmitting this information to the following driver, regardless of the slope of the road, the condition of the pavement, or the condition of the brakes.

It is another object of the present invention to provide such a system which is relatively temperature insensitive, inexpensive to manufacture, simple in construction, of relative uniform response, and highly reliable.

It is another object of the invention in which the rate of deceleration is indicated by a flashing light where rate of flashing increases exponentially with rate of deceleration to compensate for decreasing neural response with increasing frequency of flashing.

It is another object of the invention to provide a deceleration warning device applicable to all vehicles, i.e., trucks, buses, passenger cars, motorcycles.

It is another object of the invention to provide a device of the type described which is applicable to all vehicles independent of the type of brake system, i.e., mechanical, air as well as hydraulic.

It is a further specific object of this invention to provide a deceleration warning light system in which the "on" time of the light per duty cycle decreases as a function of deceleration experienced, thereby causing the warning system to be redundant in that not only the flashing rate but also the "on time per duty cycle" transmits the warning.

It is a further specific object of this invention to provide a device which will cause a rapid unconscious reflexive response to the following driver causing the driver of the following vehicle to decelerate his vehicle at a rate less than the lead vehicle.

It is a further object of this invention to provide an intervehicular communications system which eliminates the collision shock wave on freeways and roads by signaling the required deceleration information rapidly enough to cause each succeeding driver to take advantage of the separation distance between vehicles and decelerate his vehicle less than the deceleration of the vehicle immediately in front of him.

It is another object of this invention to provide an emergency flashing system having three operating modes in which the first mode, the warning light, is caused to flash by application of the brake pedal at a frequency and duty cycle determined by the deceleration of the vehicle; a second mode in which a brake pedal indication is ignored and which provides a low frequency of flashing to signal an emergency parked position off the roadway; and a third mode which ignores any brake pedal indication to provide a relatively high frequency rate of flashing to signal a condition when the vehicle is emergency parked on the roadway.

Further obects and advantages of the present invention will become apparent upon reading the following detailed description in conjunction with the accompanying drawings in which:

FIG. 1 is a diagrammatic view of one configuration of the proposed system.

FIG. 2 is a diagrammatic view of one form of transducer used in FIG. 1.

FIG. 3 is a diagrammatic view of another form of transducer.

FIG. 4 is a diagrammatic view of still another configuration of transducer for use in FIG. 1.

FIG. 5 is a schematic diagram of the flasher unit employed in FIG. 1.

FIG. 6 is a schematic diagam of another embodiment of the brake warning light system.

FIG. 8 is a diagrammatic view of the accelerometer used in the system of FIG. 7.

FIG. 9 shows the preferred relationship between deceleration and flashing rate.

FIG. 10 shows the frequency of neural discharge in impulses per second and the rate of change of the intensity of light.

FIG. 11 shows the prefered relationship between deceleration and the total time the electrical current passes through the light filament per duty cycle in seconds.

FIG. 12 shows the frequency of neural discharge in impulses per second and the strength of stimulation.

FIG. 13 shows the response frequency of neural discharge in impulses per second of an optic nerve cell at a function of time when stimulated by a flashing light of an abitrary intensity.

Figure 7:
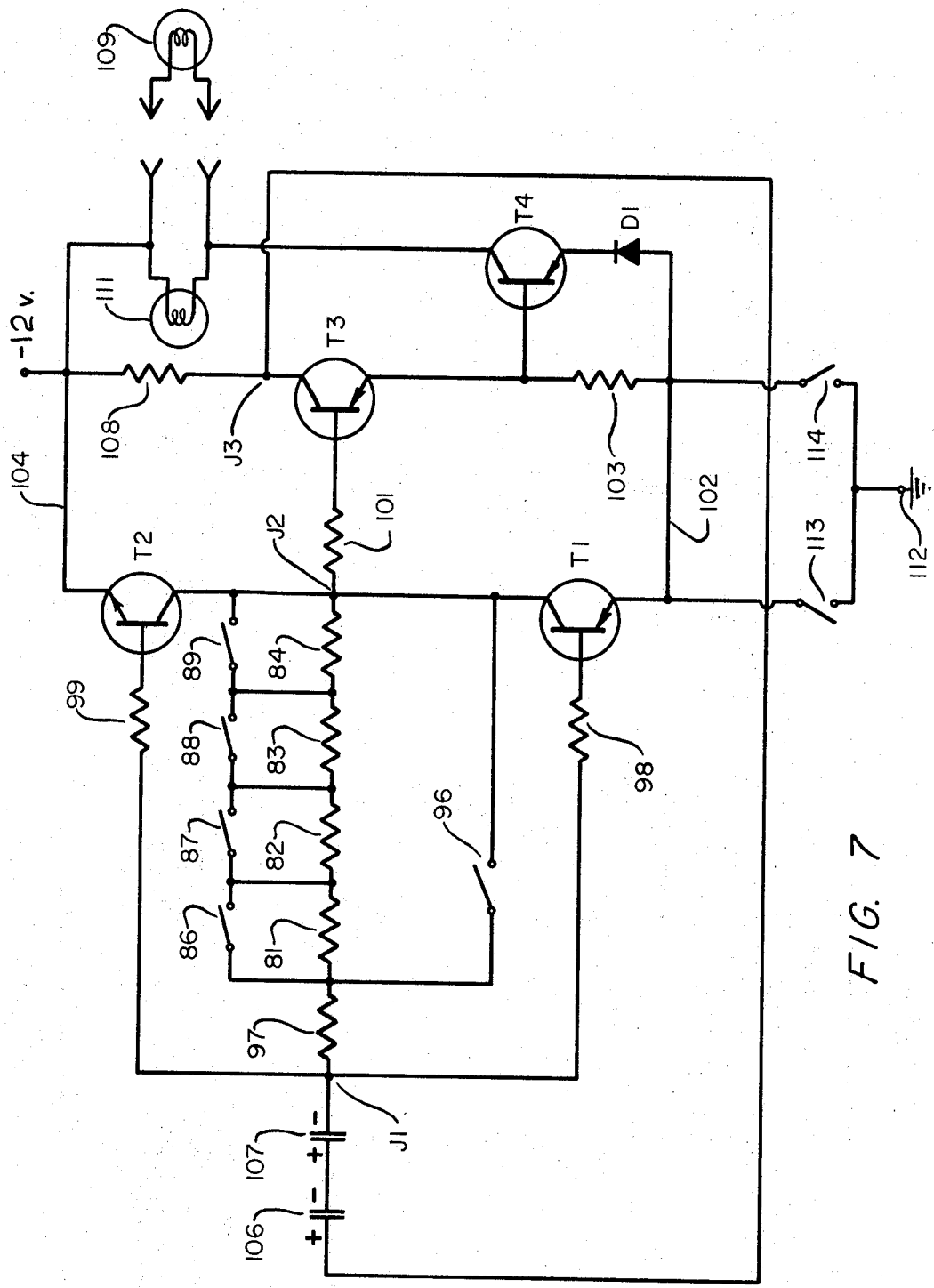
FIG. 7 is a schematic diagram of a preferred deceleration warning system.

For optimum visual perception, it has been determined that a relatively narrow range of frequency of light flashes is perceivable by the human eye. For low flash frequencies, the long interval between flashes permits the eyes' output neural responses measured in impulses per second to return to normal output before the next flash is received, allowing the brain to readily distinguish one impulse from another. As the frequency of flashing is increased, the succeeding flash begins to arrive before the neural response has returned to normal, and thus the resultant signal to the brain ceases to correlate with the flash and hence the apparent flashing light becomes first an intermittent flicker and then a constant light. The critical fusion frequency of flicker above which the signal from the eye ceases to corespond to the flash rate varies with different individuals, with the length of the "off time" of the flash and with the logarithm of the intensity of the light source, and thus depends upon the distance separating the light and the observer. But an average maximum perceptible flicker rate is generally about twenty-five cycles per second with long "off" times and a fixed intensity. Some persons have difficulty at twenty cycles per second and few can detect anything above thirty cycles.

It has been found, however, that if a standard brake light filament is to be turned on and off, rather than rotate the bulb and reflector, the determining factor for the high rate is the thermal lag of the filament. This is because the response characteristics of the eye are faster than the response characteristics of the filament. Thus, the high rate has been empirically determined to yield the best visual resolution at 7.64 flashes per second with a duty cycle of 50% on and 50% off. Shorter "on" times cause insufficient heating of the filament, hence the filament does not reach maximum brightness.

Thus, it is prefered that the flash rate be varied only from about one to approximately 7.64 flashes per second with 50% "off" time at high frequencies. Too low a flash rate, on the other hand, would not only fail to provide timely warning to a following motorist, but also, changes therein would be difficult to perceive. Timely warning means that the following driver is provided with information that would aid him. One flash per second has been empirically determined as the best frequency to provide timely warning to the motorist. An "on" time equal to 50% of the duty cycle at the low frequency allows the graded response shown in FIG. 11. Thus, each duty cycle transmits the necessary information at that instant and then repeats this information at a frequency corresponding to the deceleration of the vehicle. Thus, the warning is transmitted in two ways: first, by the amount of "on time" per duty cycle; and second, by the speed of repetition or frequency of the flashes.

FIG. 10 shows what is believed to be the relationship between the frequency of neural discharge in impulses per second of a single nerve cell in the optic nerve and the rate of change of the intensity of light. As the rate of change of intensity of light increases, the neural response in impulses per second approaches a finite limit, i.e., a constant value. Thus, the intensity of light should be caused to change at the highest possible rate. Hence, a squarewave current pulse through the filament is preferred.

FIG. 12 shows what is believed to be the relationship between the frequency of neutral discharge in the optic nerve in impulses per second and the strength of stimulation to the visual receptor cell. Note that this relationship is not linear but is exponential in nature. The frequency at any instant of neural firing, however, corresponds to the perception of danger to the animal. The strength of stimulation corresponds to the weighted algebraic sum of the intensity of the light plus the rate of change of the intensity of light as shown in FIG. 13 which shows changes in optic-nerve discharge frequency for incremental and decremental stimuli. Light-adapted steadily discharging Limulus single optic-nerve preparation stimulated by an incremental 2-second flash (a) or 2-second decrement (b). The bottom lines in each half of the figure indicate onset and termination of the stimulus. Solid lines fitted by inspection to changes in frequency of response during upward-step stimuli; broken lines are mirror images of the solid lines. In order for the animal to have a linearly increasing perception of danger, i.e., a linearly increasing perception of the deceleration of the lead vehicle, the relationship between the frequency of light flashes and deceleration must be as shown in FIG. 9. A similar argument holds for the relationship between total on-time per duty cycle and deceleration as shown in FIG. 11.

In accordance with the preferred embodiment of the invention, the flashing rate is thus caused to increase exponentially with increased deceleration to compensate for the fall-off in neural responst. As a result, the perception is linearly related to deceleration. The following shows the relationships described generally above.

A power function which closely approximates FIG. 9 is given by $$g\alpha = A(S - S_0)$$

where S is the strength of the stimulus and is proportional to the flash frequency of the filament. $g$ is the deceleration. $\alpha$ and A are constants. $S_0$ is the minimum flash rate of flashes per second.

A power function which closely approximates, FIG. 12, is $$P\alpha = \beta(S - S_0)$$

where P is the perception of danger and is proportional to the frequency of neural discharge in the optic nerve in impulses per second; $\beta$ is a constant.

Solving for P as a function of $g$, we find $$P = \left(\frac{\beta}{A}\right)^{1/\alpha} g$$

and conclude that the prerception of danger is a linear function of the deceleration which is the desired result.

Referring now to FIG. 1, the deceleration warning system is shown in conjunction with a typical hydraulic brake master cylinder of a motor vehicle, generally indicated 10. Hydraulic line 11 is connected to master cylinder 10, and through coupling 12 extends to the individual wheel cylinders through the hydraulic line 13. Also connected in the hydraulic line to the coupling 12 it is a customary form of hydraulic switch 14. The hydraulic switch 14 is of the type wherein pressure in the hydraulic line closes the switch. Such switches are in common use in the above described two-phase brake light systems presently being used. The switch 14 may also be a purely mechanical switch wherein it is actuated for movement of the brake pedal as is conventional in many vehicles.

Also connected in the hydraulic line to the conduit 15 is a hydraulic pressure transducer shown diagrammatically at 16. This transducer 16 is of a type which will produce a varying impedance as the pressure in line 15 varies as distinguished from the off-on variation produced in the hydraulic switch 14. Transducer 16 is coupled directly to a flasher unit 17 through the electrical conductors 18 and 19. Electrical power is supplied to the system by the battery 20 which may be the vehicle's storage battery. The brake light switch 14 is connected to the negative side of storage battery 20 through conductor 21, and the other side of switch 14 is connected to conductor 22 which, in turn, connects to the brake lamps 23 and 24. The other sides of lamps 23 and 24 are coupled to the flasher unit 17 through the conductor 25. The flasher unit is connected to ground potential as shown at 26 which completes the circuit to the positive side of the storage battery 20.

It will thus be seen that depression of the brake pedal 27 creates pressure in the master cylinder 10 which, in turn, closes the brake switch 14. Flasher 17 is thereby coupled to the negative side of storage battery 20 through conduit 28 and the lamps are caused to flash in a manner which will be more completely described subsequently. At any degree of depression of the brake pedal 27, the brake lights will flash and the transducer 16 causes such changes in the flasher unit 17 as will vary this flash rate.

As an optional feature of this invention, there is generally indicated at 29 an emergency parking switch consisting of two switches. Switch 30 operates to bypass the transducer 16 thereby effectively reducing the impedance which transducer 16 would otherwise add to the flasher unit circuit so that the flash rate produced by unit 17 is extending to its maximum rate. Switch 31 bypasses the brake light switch 14 so that the brake pedal does not have to be depressed. Closing both switches 30 and 31, which could be a double pole switch, thus flashes the brake lights 23 and 24 at the maximum rate regardless of the position of transducer 16 or of the hydraulic fluid in the brake system. Such an emergency system may also be useful in cases of hydraulic fluid loss where the motorist must rely on an alternative mechanical system.

FIGS. 2, 3 and 4 described various alternatives for hydraulic pressure transducers to be employed as the transducer unit 16. FIG. 2 shows the use of a Bourdon tube 32 to which is attached a resistance type strain gauge 33. Strain gauge 33 is connected as one of the arms in a typical resistance bridge network generally designated 34. The impedance of this device, indicated $Z_o$, then appears across the conductors 18 and 19 indicated in FIG. 1.

As an alternative form, FIG. 3 shows a carbon pile resistance transducer. Powdered graphite or carbon 35 is contained in a cylinder 36 with a piston element 37 actuated by fluid in the hydraulic line 15. Electrical connections are made at 38 and 39 at opposite ends of the carbon pile 35 as shown. An increase of hydraulic pressure in line 15 will force the piston 37 into the cylinder 36 compressing the graphite 36, and thereby reducing the electrical resistance thereof. This change in resistance as a function of hydraulic pressure will then appear as a change in $Z_o$ at the terminals as shown.

FIG. 4 shows still another form of pressure transducer wherein the hydraulic lines 15 is connected to pressure cylinder 40. Inside cylinder 40, there is a piston 41, piston seal 41a, spring 42 and piston rod 43. Piston rod 43 is pivotally attached to a pivot arm 44 which is rotatably mounted at 45 and has a gear segment 46 at the opposite end thereof. Gear segment 46 is adapted to mesh with a spur gear 47 which, in turn, is mounted upon the shaft 48 of a potentiometer 49. The terminals 50 and 51 of potentiometer 49 provide the connections to which conductors 18 and 19 are attached to obtain the varying impedance indicated at $Z_o$. As can be seen from the drawing, an increase in hydraulic pressure in line 15 will force the piston 41 to the right against the force of the spring 42 which will pivot the arm 44 in a clockwise direction. This will cause the spur gear 47 to rotate counter-clockwise whereupon the wiper 52 of potentiometer 49 will likewise rotate in a counter-clockwise direction whereby the wiper will extend over a fewer number of turns of potentiometer thereby decreasing the impedance across terminals 50 and 51. The effort then of an increase of pressure in line 15 is a decrease in impedance, $Z_o$.

Turning now to FIG. 5, an example of a suitable flasher unit and the effect of a change in $Z_o$ will be described. In this flasher unit, the transducer is connected to the terminals 53 and 54. As above described, when switch 14 is closed as a result of braking pressure, a negative voltage is applied to conductor 28 and to the RC charging circuit consisting of resistor 55, the impedance $Z_o$ from transducer 16, and resistor 56, in conjunction with the capacitor 57. The negative voltage will also be applied to collector 59c of transistor 59 through bias resistor 58. The base 59b of transistor 59 is connected to resistor 56 and to the capacitor 57 which, in turn, is connected to ground. The emitter electrode 59e connects through the relay coil 60 to ground. Due to the current through resistors 55, 56 and $Z_o$, capacitor 57 will charge exponentially. Since its potential and that at base 59b will be more negative than emitter 59e, transistor 59 will conduct. Current will flow through emitter 59e and coil 60 from ground. Potential at base 59b will rise, as a result of the increasing charge on capacitor 57, and the emitter current in coil 60 will likewise increase until it reaches the pull-in value. At that point, the contacts 61 are closed and the capacitor 57 will discharge through diode 62 and resistor 63, presenting a negative pulse at base 64b of transistor 64. This pulse causes transistor 64 to conduct. Current flows to emitter electrode 64e through resistor 65 from ground, and through collector electrode 64c through conductor 25 to the lamps 23, 24.

The amplitude of the pulse applied to base 64b is limited by resistor 63 and divided by resistors 55 and 56. Transistor 64 will conduct until capacitor 57 discharges to the point where current in the emitter 59e loop falls below the dropout value for the relay. Then contacts 61 are opened and capacitor 57 will commence charging again. The capacitor discharge path includes the two resistors 65 and 66, and they are small in value to produce a relatively short output pulse at 64c as compared with the duty cycle. The charging period for capacitor 57 is determined by the RC combination consisting of fixed resistors 55 and 56 and the varying impedance, $Z_0$ offered at the terminals 53 and 54. As $Z_0$ is varied, as explained in conjunction with the transducer units shown in FIGS. 2–4, the charging period is varied over any desired range.

The rate of flashing of the unit shown in FIG 5. may be varied exponentially by appropriately selecting the impedance elements so that the impedance changes in an exponential manner. For example, the potentiometer 49 may include a non-linear resistance element.

As a still further embodiment of the present invention, another means for producing a varying pulse rate is that shown in FIG. 6. A generator 67 can be attached to a wheel, axle or to any rotating part of the vehicle which has a rotational speed proportional to the vehicle speed. Generator 67 may be DC, or an AC generator with an external rectifier. The generator will produce an output voltage level which is proportional to the speed of the shaft to which it is coupled and accordingly, to that of the vehicle. Capacitor 68 and resistor 69 are connected across the generator 67 to provide approximate differentiation of the voltage level output, thereby producing across resistor 69, a voltage proportional to deceleration. The RC time constant of capacitor 68 and resistor 69 is kept small compared to the rates of change of voltage produced by braking of the vehicle. It is found that a time constant of approximately .10 second is sufficiently small.

Preferably, a low pass filter, consisting of resistors 70 and 71 and capacitors 72 and 73, is connected across the resistor 69 to filter out high frequency ripple. The time constant of this filter should be small in comparison with the deceleration signals, for example, less than .05 second.

Obviously, variable output voltage may be utilized to control the rate of flashing of the braking lights in several ways. A specific example is shown in FIG. 6. In this example, an amplifier stage shown generally at 74 is inserted between the output of the filter and the input of a pulse generator 75 which provides output pulses of supply current to the lights, the repetition rate of which is proportional to the applied voltage. A circuit generally similar to that of FIG. 5 may be employed for the pulse generator 75. For example, the output of the amplifier, of negative polarity, may be connected directly to terminal 53 of FIG. 5. The magnitude of the amplifier output will determine the rate of charging of capacitor 57 which will control the repetition frequency of the pulses applied to the lamp circuit in the manner previously described. Thus, where the rate of change of the voltage level produced by generator 67 is high, i.e., where it is rapidly decelerating, the magnitude of the output voltage from the amplifier will be large and therefore the capacitor 57 will be rapidly charged so that a high flash rate will be produced. Correspondingly, when the voltage level at generator 67 changes only slightly, the differentiation thereof produces only a small voltage output and capacitor 57 will charge slowly producing a correspondingly slower flash rate.

This generator-driven means for varying the flash rate of the brake lights can be inserted in the diagram of FIG. 1 in place of the transducer 16, deleting of course, the connection of hydraulic line 15. As a still further modification, the hydraulic brake switch 14 may be eliminated and the conductor 28 attached directly to conductor 21 and thence to the negative side of battery 20. Then, any deceleration of the vehicle will cause the brake lights to flash, regardless of whether the brakes are applied. Thus, shifting into a lower gear, encountering a steep grade or running the vehicle into water or sand will flash the lights to warn the following motorist in instances where he may otherwise have been unaware of these conditions because the leading motorist did not apply his brakes, or applied them too late. Also, warning will still be given though the lead vehicle's hydraulic system has failed. Proper adjustment of the output of amplifier 74 will be necessary so that all significant decelerations will produce an output sufficient to close the relay contacts 61. Further, a diode should be interposed between capacitor 73 and amplifier 74 to restrict passage of positive-going signals produced during acceleration of the vehicle. As a further precaution, an additional current limiting diode should be inserted at this point to limit the amplitude of the negative-going signals so that the transistors and other circuit elements in amplifier 74 and flasher unit 17 are not damaged. An extremely fast stop, such as experienced even in minor collisions, woud produce a very large voltage pulse with needless damage resulting to the flasher unit.

Referring to FIG. 7, there is shown a preferred embodiment of my invention. This embodiment includes an accelerometer responsive to deceleration to exponentially vary an impedance. The impedance is connected in an electronic switching circuit which controls the current to the brake light system. The electronic circuit is responsive to changes in impedance such that its switching rate changes.

In the circuit shown, the variable impedance comprises the resistors 81, 82, 83 and 84. The resistors are connected in parallel with corresponding switches 86, 87, 88 and 89, respectively, which short out the associated resistor when they are closed.

Referring particularly to FIG. 8, a schematic diagram of the switches 86, 87, 88 and 89 is presented. Each of the switches comprises a mercury switch. The switches illustrated include an insulated housing 91, an inner conductive chamber 92 which serves to hold mercury 93, and a terminal 94 extending into the chamber 92 but electrically insulated therefrom. Terminal leads are connected to chamber 92 and terminal 94. When the mercury touches the terminal, it completes the circuit (closes the switch) between the chamber walls and the terminal. By suitably mounting a plurality of switches at different angles with respect to the horizontal, they will be progressively closed as the deceleration increases. The amount of deceleration required to close the switch can be controlled by controlling its position with respect to the horizontal. Thus since the switches 86, 87, 88 and 89 are mounted directly to the frame or body of the vehicle in question, any deceleration measurement includes that deceleration caused by the intensity of the brake application by the driver, deceleration caused by all other friction forces including aerodynamic, which vary from vehicle to vehicle, and lastly the algebraic component of gravity due to hills which is parallel to the slope of the road. Thus, for example, when going downhill a greater deceleration should be indicated by the warning system of the present invention because of the additional effect of gravity which in effect places a greater burden on the braking system or makes it less efficient for the same amount of force applied.

Referring again to FIG. 7, the plurality of resistors 81, 82, 83 and 84 have a manual switch 96 connected in shunt therewith. Closure of this switch serves to bypass all of the resistors and provide a high switching rate as will be presently described.

The resistors are connected in series with resistor 97. Transistors T1 and T2 have their base terminals connected to the junction J1 of resistor 97 through base resistors 98 and 99, respectively. The collectors of transistors T1 and T2 are connected to one another and to the base of transistor T3 through resistor 101. The emitter of transistor T3 is connected to line 102 through resistor 103. The emitter of transistor T1 is connected directly to line 102. The emitter of transistor T2 is connected directly to line 104. The junction J1 is connected to the collector of transistor T3 through capacitors 106 and 107. The collector is resistively connected to line 104 through resistor 108.

Switching transistor T4, which controls the current through the brake and indicator lights, has its base coupled directly to the emitter of transistor T3. The emitter is connected to line 102 through a diode D1. The collector is connected to the line 104 through brake lights 109 and indicator light 111.

Power is applied to the circuit at terminal 112. Manual switch 113 and brake switch 114 connect power to the line 102. When either of the switches 111 or 112 is closed, the circiut is energized.

When either the switch 113 or 114 is closed, the circuit is energized. At this time, either the transistors T2, T3 and T4 are conducting in the saturated region and T1 is not conducting, or vice versa. Assuming the former state, the lamps 109 and 111 are energized. The voltage at J2 is approximately −12 volts, and at J3, zero volts. With transistor T1 conducting saturated and transistors T2, T3 and T4 non-conducting, the voltages at J2 and J3 are reversed to approximately zero and −12 volts.

The junction J1 is resistor coupled to J2 and capacitor coupled to J3; since the voltages at J2 and J3 are out-of-phase square waves, the voltage at J1 is of such a waveform to change the states of T1 and T2 quite cleanly at a level of about −6 volts. The decay time of the waveform at J1 may be controlled by changing a single component (the resistive coupling in the present circuit) and the circuit frequency may thus be changed.

Thus, when the brake switch 114 is first closed and before the vehicle begins to decelerate, the maximum resistance is present since the switches 86, 87, 88 and 89 are open and the circuit is at its lowest operating frequency. As the vehicle decelerates, the switches 86, 87, 88 and 89 are successively closed and the frequency of operation increases.

When the vehicle is standing still, it is possible to cause the circuit to operate by closure of the manual switch 113. When the switch 113 is closed, the rate of operation will be a low flashing rate since all the resistances are in the circuit. To provide a different type of warning, as for example, when the vehicle is stopped in the middle of a freeway, and to indicate greater danger, the switch 96 is also closed thereby causing the circuit to operate at a relatively high frequency. This is manual operation to take care of emergency situations.

In all other instances, the switches 96 and 113 are left open and the brake switch 14 serves to energize the circuit and cause the commencement of flashing of the brake lights 109 and 111. The brake switch 114 may comprise a mechanical switch conventionally coupled to the brake linkage. The switch 114 may comprise a switch which is responsive to manifold pressure. Two types of switches, brake and manifold may be connected in parallel to provide a redundant response.

Referring particularly to FIG. 9, there is presented a curve showing the preferred relationship between deceleration in g's and the frequency of flashes in seconds. This relationship gives a preferred neural response. Preferably the change in rate should follow the smooth curve 116. However, in the circuit shown in FIG. 7, the flashing rate is changed stepwise as shown by the steps indicated in dotted line. Without any of the mercury switches open, but with the brake pedal switch closed, the switching rate is indicated by the flat line 117a. This rate is constant up to 0.1 g at which point a first mercury switch closes to increase the rate of flashing to a second level of 117b. This rate is constant up to 0.2 g deceleration at which point a second switch closes and the next flashing rate is obtained, as shown by the flat line 118. The switches are closed consecutively to give the steps 118, 120 and 121.

If it is desired to obtain a more gradual increase in frequency, additional switches may be provided, or an exponential type of resistive change can be achieved, as for example, by nonlinearly winding the resistor shown in FIG. 4.

It is thus seen that there is provided an improved circuit in which variation of an impedance element associated with a stable electronic switching circuit serves to control the flashing frequency and duty cycle. Furthermore, the impedance element is preferably selected to have an exponential change in value whereby to give an increasing flashing rate with an increase in deceleration to compensate for decreasing neural response as the frequency increases.

It is apparent that other types of pressure sensitive transducers may be employed as well as many types of accelerometers. It is further apparent that rather than controlling the energization of the brake lights, it would be possible to keep the light on constantly and place a movable shutter in front of the lamp to alternately block and transmit light at the desired flashing frequency, or to rotate the bulb and reflector.

A circuit was constructed in accordance with FIG. 7 in which the switches, resistors, capacitors and other components were as follows:

Resistors:
    81—390 ohms
    82—560 ohms
    83—680 ohms
    84—1200 ohms
    97—560 ohms
    98—33 kohms
    99—27 kohms
    101—1700 ohms
    103—100 ohms
    108—30 ohms
Capacitors:
    106—200 microfarads
    107—200 microfarads
Transistors:
    T1—2N217
    T2—2N647
    T3—40253
    T4—2N217
Diode: D1—20H85
Switches:
    86—Durakool Tilt Switches
    87—Durakool Tilt Switches
    88—Durakool Tilt Switches
    89—Durakool Tilt Switches
Lamps:
    108—#1034
    109—
Voltage:
    Line 102—+12
    Line 104——12

A circuit constructed in accordance with the foregoing operated as shown in the dotted stepped curve of FIG. 9.

While a number of embodiments of the present invention have been shown and described, it will be obvious to those skilled in the art that changes and modifications may be made without departing from this invention in its broader aspects and, therefore, it is the aim of the appended claims to cover all of such changes and modifications as fall within the true spirit and scope of this invention.

I claim:

1. In a deceleration warning system of the type including a source of light, means for controlling said light whereby to provide flashes of light, and an electrical switching circuit serving to energize said last named means for causing the same to flash said light at a predetermined variable rate, said switching circuit including a frequency determining impedance element serving to control the switching rate, and means for controlling said impedance so that it varies in accordance with deceleration whereby said light flashes at said predetermined variable rate in accordance with deceleration.

2. A deceleration warning system as in claim 1 in which said impedance means provides a non-linear impedance whereby the switching rate increases exponentially with deceleration so that the flashing rate increases exponentially.

3. A deceleration warning system as in claim 2 in which said switching means serves to decrease the duration of the flash in proportion to the increase in frequency to provide a dual warning of deceleration.

4. In a deceleration warning system of the type including a lamp energized by current from an electrical power supply, the improvement comprising means for interrupting said current at a rate which is controlled by the deceleration of said vehicle but which is independent of the speed of said vehicle wherein said interrupting means includes impedance means, means for controlling the impedance so that it varies with deceleration, and a pulse forming circuit operatively coupled to said impedance means and controlling said interrupting means so that the repetition rate of pulses formed by said circuit is controlled by the deceleration.

5. A deceleration warning system as in claim 4 where said impedance means varies exponentially with deceleration so that the repetition rate increases with increasing deceleration.

6. A deceleration warning system as in claim 5 where said pulse forming circuit provides pulses whose duration decreases with increasing frequency.

7. In a deceleration warning system of the type including a lamp energized by current from the vehicle electrical power supply, the improvement comprising means for interrupting said current at a rate which is controlled by the deceleration of said vehicle but which is independent of the speed of said vehicle wherein said interrupting means includes means producing a first electrical signal corresponding to the speed of the vehicle and differentiating means for deriving from said first signal a second electrical signal corresponding to the rate of charge of the speed of the vehicle and a pulse forming circuit operatively coupled to said differentiating means whereby the repetition rate of the pulses formed by said pulse forming circuit is controlled by the deceleration of said vehicle.

8. A motor vehicle warning system comprising one or more lamps, a source of electric potential coupled to said lamps, and means interposed between said lamps and said potential source to control the flow of current therebetween; said control means including switch means operative to permit said current flow only when said vehicle brakes are actuated, means for periodically interrupting said current when said switch means is operative to periodically flash said lamps, and means for controlling the frequency of said periodic interruption at a rate which varies exponentially or as a power function with a component of deceleration of said vehicle.

9. A warning system as in claim 8 including additionally manually operable switch means for controlling the frequency of periodic interruptions to selectively provide a low or high frequency of interruption.

10. In a brake light warning system for motor vehicles having hydraulic brake systems, the combination comprising one or more lamps, a source of electric potential coupled to said lamps, and means interposed between said lamps and said potential source to control the flow of current therebetween; said control means including a switch means having two terminals, said switch means coupled to said hydraulic system and responsive to increased pressure therein to close said switch, one terminal of said switch connected to said potential source, the other terminal coupled to a pulse forming means, said pulse forming means being coupled to said lamps and determining the flashing rate of said lamps; and impedance means, and means for controlling the impedance so that it varies with deceleration to control the repetition rate of said pulse forming means and said lamps in accordance with variations in said deceleration.

11. A warning system as in claim 10 including additionally manually operable switch means for controlling the frequency of periodic interruptions to selectively provide a low or high frequency of interruption.

12. A system of the type described in claim 10 wherein said switch means comprises a hydraulic pressure transducer, said transducer having a Bourdon tube coupled to said hydraulic system of the vehicle, a strain gauge mounted upon said tube, said strain gauge electrically connected in one leg of a bridge circuit, said bridge circuit thus providing an impedance which varies in proportion to the hydraulic pressure.

13. A system of the type described in claim 10 wherein said switch means comprises a cylinder and a piston, said cylinder partially filled with carbon, a hydraulic line connected to said cylinder and adapted to cause said carbon to move into said cylinder and to compress said carbon therein, a conductive means attached to each end of said cylinder in electrical contact with said carbon, said device providing an impedance which varies in proportion to the hydraulic pressure.

14. A system of the type described in claim 10 wherein said switch means comprises a cylinder, a piston situated in said cylinder and having a piston rod and a return spring on one side thereof, a hydraulic line coupled to said cylinder and communicating with the other side of said piston; a potentiometer, said piston rod coupled to means for adjusting said potentiometer, conductive means coupling said potentiometer to said pulse forming means, whereby the repetition rate of said pulse forming means is controlled by the impedance of said potentiometer.

15. In a brake light warning system for motor vehicles having brake systems, the combination comprising a plurality of lamps, a source of electric potential coupled to said lamps, and means interposed between said lamps and said potential source to interrupt the flow of current therebetween; said control means including a pulse forming means, said pulse forming means coupled to said lamps; accelerometer means coupled to said pulse forming means for controlling the repetition rate thereof.

16. In a brake light warning system for motor vehicles having brake systems, the combination comprising one or more lamps, a source of electric potential coupled to said lamps, and means interposed between said lamps and said potential source to control the flow of current therebetween, said control means including a switch means having two terminals, said switch means coupled to said brake system and responsive to increased pressure therein to close siad switch, one terminal of said switch connected to said potential source, the other terminal coupled to a pulse forming means, said pulse forming means being coupled to said lamps and determining the flashing rate of said lamps, said flashing rate being varied exponentially or as a power function thereby with a component of deceleration of said vehicle, a pressure sensitive means coupled to said brake system for controlling and varying the repetition rate of said pulse forming means by the degree of brake pressure applied and said flashing rate; switch means for bypassing said pressure sensitive means and said hydraulic switch means for actuating said pulse forming means at a given repetition rate.

17. A deceleration warning system including warning lights, means for flashing said lights at a given rate with a given on time, and means connected to said flashing means for increasing the rate and decreasing the on time with increasing deceleration to give a redundant warning of deceleration.

18. A deceleration warning system as in claim 17 in which the "on" time is substantially 50 percent of the duty cycle and the rate of flash is varied between 1 and 7.64 flashes per second.

19. An intervehicular deceleration warning communications system for communicating a component of deceleration initiated by the driver of a leading vehicle to the driver of a following vehicle, said system comprising, a source of light mounted on said leading vehicle, means for interrupting the light from said source, and an electrical switching circuit responsive to said deceleration component for controlling said light interrupting means to vary the rate of light interruption at a rate which varies exponentially or as a power function with said deceleration component.

20. An intervehicular deceleration warning communications system as in claim 19 in which the "on" time during which said light is not interrupted decreases with increasing deceleration.

21. An intervehicular deceleration warning communications system as in claim 19 in which said leading vehicle includes a gas pedal for determining the amount of fuel fed to the engine and in which said electrical switching circuit is inhibited from communicating or sensing said deceleration component until the driver's foot is removed from the gas pedal.

22. An intervehicular deceleration warning communications system as in claim 19 together with an accelerometer mounted rigidly to said leading vehicle for sensing said component of deceleration and coupling an electrical signal indicative of said deceleration to said electrical switching circuit.

References Cited

UNITED STATES PATENTS 2,091,086   8/1937   Taylor.

ALVIN H. WARING, Primary Examiner

U.S. Cl. X.R.

200—61.45; 338—13; 340—262

PO-1050
(5/69)

UNITED STATES PATENT OFFICE
CERTIFICATE OF CORRECTION

Patent No. 3,528,056      Dated September 8, 1970

Inventor(s) John Voevodsky

It is certified that error appears in the above-identified patent and that said Letters Patent are hereby corrected as shown below:

Column 6, line 25, change "g$\alpha$" to --$g^{\alpha}$--

Column 6, line 33, change "P$\alpha$" to --$p^{\alpha}$--

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents